United States Patent
Tate, Jr.

(10) Patent No.: US 8,996,295 B2
(45) Date of Patent: Mar. 31, 2015

(54) VEHICLE RANGE PROJECTION

(75) Inventor: Edward D. Tate, Jr., Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/609,599

(22) Filed: Sep. 11, 2012

(65) Prior Publication Data

US 2014/0074391 A1    Mar. 13, 2014

(51) Int. Cl.
- *G01C 21/00* (2006.01)
- *B60L 11/18* (2006.01)
- *G01C 21/36* (2006.01)
- G01C 21/26 (2006.01)
- G01C 21/30 (2006.01)
- G01C 21/34 (2006.01)

(52) U.S. Cl.
CPC ......... *B60L 11/1862* (2013.01); *G01C 21/3679* (2013.01)
USPC ........... 701/400; 701/123; 701/409; 701/410; 701/411; 701/412; 701/413; 701/414; 701/415; 701/416; 701/417; 701/418; 701/423; 701/424; 701/425; 701/426; 701/428

(58) Field of Classification Search
CPC ... B60W 30/095; B60W 40/00; B60W 40/10; B60W 40/12; B60W 40/13; B60W 2040/12; B60W 2040/13; G01C 21/00; G01C 21/26; G01C 21/30; G01C 21/34; G01C 21/3469; G06F 17/00; G06F 17/30241
USPC .......... 701/123, 400, 409–418, 423–426, 428
See application file for complete search history.

(56) References Cited

U.S. PATENT DOCUMENTS

| | | | | |
|---|---|---|---|---|
| 6,484,088 B1* | 11/2002 | Reimer | | 701/123 |
| 7,133,771 B1* | 11/2006 | Nesbitt | | 701/533 |
| 7,447,593 B2* | 11/2008 | Estkowski et al. | | 701/301 |
| 7,881,730 B2* | 2/2011 | Sheha et al. | | 455/456.1 |
| 7,974,774 B2* | 7/2011 | Kumar | | 701/123 |
| 8,190,533 B2* | 5/2012 | Dickman | | 705/335 |
| 8,290,701 B2* | 10/2012 | Mason et al. | | 701/422 |
| 8,510,040 B2* | 8/2013 | Nesbitt | | 701/437 |
| 8,566,030 B1* | 10/2013 | Demiryurek et al. | | 701/426 |
| 8,577,390 B2* | 11/2013 | Sheha et al. | | 455/456.1 |
| 8,612,273 B2* | 12/2013 | Johnson | | 705/7.11 |
| 2004/0068520 A1* | 4/2004 | Masaoka | | 707/104.1 |
| 2005/0216181 A1* | 9/2005 | Estkowski et al. | | 701/200 |
| 2006/0235610 A1* | 10/2006 | Ariyur et al. | | 701/202 |
| 2007/0233364 A1* | 10/2007 | Kumar | | 701/200 |
| 2008/0125958 A1* | 5/2008 | Boss et al. | | 701/123 |
| 2008/0275643 A1* | 11/2008 | Yaqub et al. | | 701/209 |
| 2008/0294331 A1* | 11/2008 | Fushiki et al. | | 701/119 |
| 2009/0063032 A1* | 3/2009 | Das | | 701/201 |
| 2009/0287407 A1* | 11/2009 | Sheha et al. | | 701/201 |
| 2010/0164701 A1* | 7/2010 | Bargman et al. | | 340/436 |
| 2010/0286909 A1* | 11/2010 | Tate et al. | | 701/209 |

(Continued)

*Primary Examiner* — Mary Cheung
*Assistant Examiner* — Atul Trivedi
(74) *Attorney, Agent, or Firm* — Cantor Colburn LLP

(57) ABSTRACT

Vehicle range projection is implemented by a host system having logic executable thereon. The logic identifies a starting location of a vehicle and identifies destination locations for the vehicle. The logic also builds routes from the starting location to the destination locations based on routing objectives and travel constraints. The logic further outputs at least a portion of at least one route and travel cost information associated with the at least a portion of at least one route.

20 Claims, 4 Drawing Sheets

(56) References Cited

U.S. PATENT DOCUMENTS

| | | | |
|---|---|---|---|
| 2011/0122797 A1* | 5/2011 | Sheha et al. | 370/254 |
| 2011/0137691 A1* | 6/2011 | Johnson | 705/5 |
| 2011/0246246 A1* | 10/2011 | Johnson | 705/5 |
| 2011/0288738 A1* | 11/2011 | Donnelly et al. | 701/99 |
| 2011/0298640 A1* | 12/2011 | Tate, Jr. | 340/995.1 |
| 2012/0004838 A1* | 1/2012 | Lee et al. | 701/123 |
| 2012/0022781 A1* | 1/2012 | Wilson | 701/410 |
| 2012/0089327 A1* | 4/2012 | Miura et al. | 701/411 |
| 2012/0101728 A1* | 4/2012 | Kudo | 701/540 |
| 2012/0158299 A1* | 6/2012 | Cerecke et al. | 701/533 |
| 2012/0173134 A1* | 7/2012 | Gutman | 701/400 |
| 2012/0173135 A1* | 7/2012 | Gutman | 701/408 |
| 2012/0179362 A1* | 7/2012 | Stille | 701/410 |
| 2012/0202530 A1* | 8/2012 | Sheha et al. | 455/457 |
| 2012/0221234 A1* | 8/2012 | Sujan et al. | 701/123 |
| 2012/0232783 A1* | 9/2012 | Calkins et al. | 701/411 |
| 2013/0179062 A1* | 7/2013 | Yasushi et al. | 701/123 |
| 2013/0282272 A1* | 10/2013 | Kluge et al. | 701/425 |
| 2013/0325309 A1* | 12/2013 | Lange | 701/123 |
| 2013/0325310 A1* | 12/2013 | Lange | 701/123 |
| 2014/0067246 A1* | 3/2014 | Eldredge et al. | 701/123 |

* cited by examiner

VEHICLE RANGE PROJECTION

FIELD OF THE INVENTION

The subject invention relates to data processing, and more particularly, to determining a geographically reachable area for a vehicle based on both routing objectives and travel constraints.

BACKGROUND

Global positioning systems (GPSs), handheld devices, and online map routing services provide mechanisms to navigate from one point to another by calculating paths based on information derived from roadway maps. Routing systems typically have usability features to automatically calculate the type of directions desired. The usability features allow an operator to specify routing objectives such as: shortest distance (using an algorithm to determine the shortest distance from one point to the next); least amount of travel time (using an algorithm to determine the shortest distance based on the road's speed limit and distance, and calculating the resulting driving time); least use of freeways; least use of energy (gasoline and/or electricity); and least use of toll roads.

Routing systems (also referred to herein as mapping engines) typically include cartographic maps and map databases to determine an appropriate driving route. The map databases represent a network of roads and often include information about toll roads, speed limits, highway exit points, and points of interest (POIs). The map databases also include points on a map (also known as waypoints) represented in the form of latitudes and longitudes, universal transverse Mercator (UTM) coordinates, and/or geospatial coordinates. Some examples of waypoints include POIs (e.g., museums, restaurants, railways, exit points, etc.), satellites, user-entered destinations, and fixed reference points along a route. These waypoints can be marked on maps in the routing systems.

A route is a series of two or more waypoints. In order to determine a suggested route, a routing system first determines a set of waypoints between a starting point and a destination point. The routing system then guides a user to a nearest waypoint along the route, then to the next waypoint in the route, and so on, until the user reaches the destination point. A typical routing system resolves the starting point and the destination point into its nearest known waypoints on the network and then uses a "great circle routing algorithm" to determine a route between two points. Some routing systems also use a search algorithm to search a graph of nodes (representing waypoints) and edges (representing paths between waypoints). Some examples of search algorithms that can be used to determine a route between two points are Dijkstra's algorithm (to determine the shortest path), an A* algorithm (to determine the shortest path along a weighted graph), and a bi-directional search algorithm.

Routing systems are designed to take into account routing objectives when determining a route between two points. However, a vehicle operator may also be constrained by other factors that impact a range that the vehicle can travel. For example, when selecting POIs, an operator may only have a specified amount of time to travel to the POI. In another example, an operator of an electric vehicle may be looking for a recharge station that is within a selected kilowatt hour (kwHr) range of the current location of the vehicle. Accordingly, it would be desirable to provide a way to determine a range of geographic locations that a vehicle can visit based on both routing objectives and travel constraints.

SUMMARY OF THE INVENTION

In one exemplary embodiment of the invention, a system for providing vehicle range projection is provided. The system includes a host system computer and logic executable by the host system computer. The logic is configured to implement a method. The method includes identifying a starting location of a vehicle and identifying destination locations for the vehicle. Routes are built from the starting location to the destination locations based on routing objectives and travel constraints. At least a portion of at least one route and travel cost information associated with the at least a portion of at least one route are output.

In another exemplary embodiment of the invention, a method for providing vehicle range projection is provided. The method includes identifying a starting location of a vehicle and identifying destination locations for the vehicle. Routes are built from the starting location to the destination locations based on routing objectives and travel constraints. At least a portion of at least one route and travel cost information associated with the at least a portion of at least one route are output.

In yet another exemplary embodiment of the invention a computer program product for implementing vehicle range projection is provided. The computer program product includes a computer-readable storage medium having instructions embodied thereon, which when executed by a computer, cause the computer to implement a method. The method includes identifying a starting location of a vehicle and identifying destination locations for the vehicle. Routes are built from the starting location to the destination locations based on routing objectives and travel constraints. At least a portion of at least one route and travel cost information associated with the at least a portion of at least one route are output.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
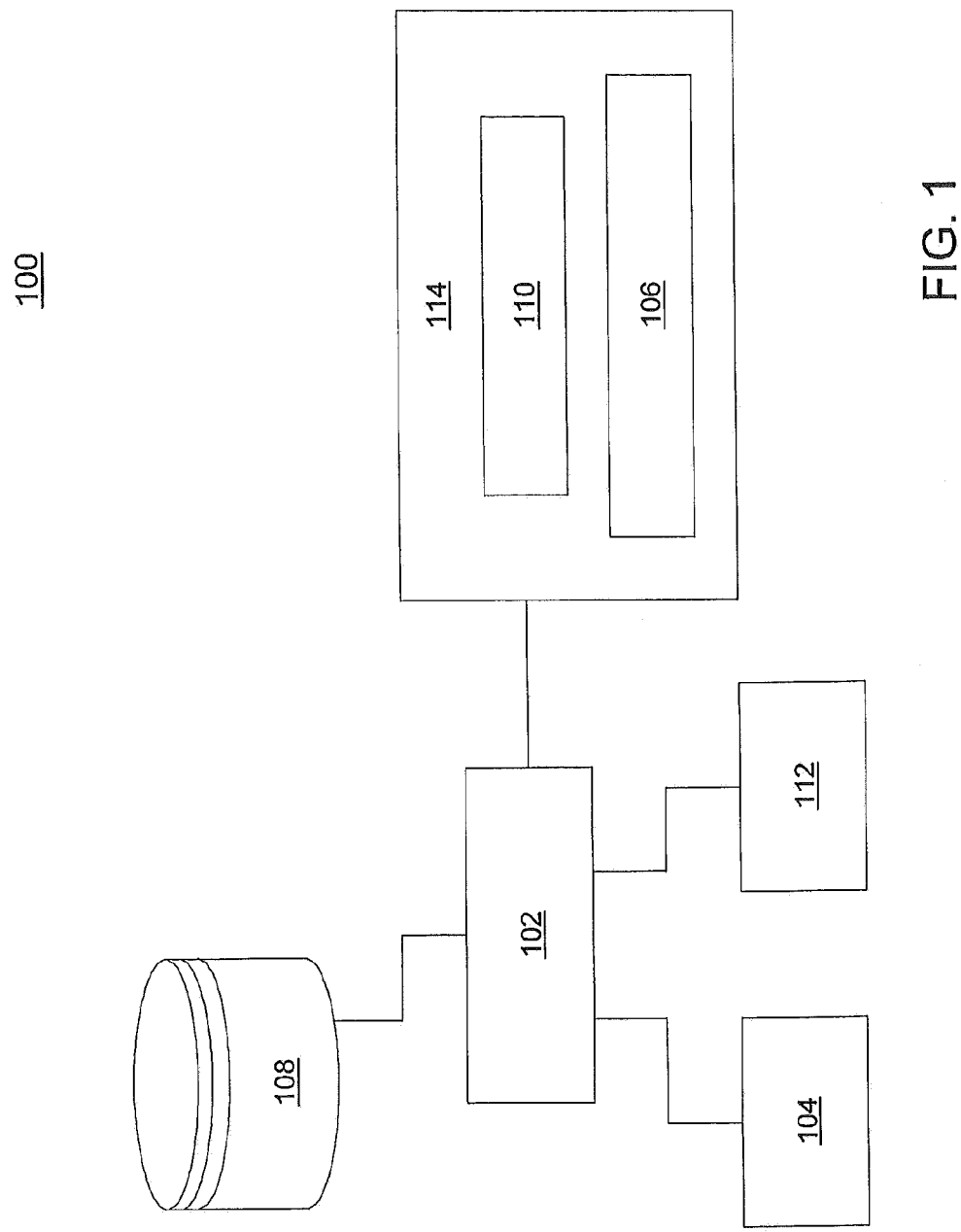
FIG. 1 is a system upon which vehicle range projection may be implemented in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, a travel range of a vehicle is determined by taking into consideration both a routing method and a travel constraint. Different routing methods have different routing objectives, for example, to minimize travel time, to minimize travel distance and/or to minimize energy usage (e.g., gasoline and/or electricity). As used herein, the term "travel constraint" refers to vehicle range restrictions such as, but not limited to: a distance (e.g., within three miles); an amount of time (e.g., within three minutes); or an energy usage (e.g., less than 0.3 kwHrs). In accordance with exemplary embodiments, information about the projected travel range of the vehicle is output to a display device in the vehicle and presented, via the display device, to the operator of the vehicle or to a passenger in the vehicle. This projected travel range may then be used, for example, to select one or more points of interest along a route to a destination that meet a specified travel constraint(s).

In an embodiment, the vehicle is a limited range powertrain vehicle such as a battery electric vehicle (BEV) or an extended range electric vehicle (EREV), and the travel constraint is an electricity range of the vehicle. In another embodiment, the vehicle is a gasoline powered automobile.

In an embodiment, the projected travel range is determined by first replacing a node representing the destination location with a virtual node that corresponds to a distance beyond the reach of the travel constraints. A secondary cost is then accumulated based on the travel constraint(s) as a mapping engine calculates a minimizing route based on the routing objective(s). When the secondary cost exceeds the travel constraint cost, graph node neighbors are prevented from being considered in developing the range projection. A reachable region is highlighted on a display device based on the nodes in the map that can be reached. In this manner, drivers are assisted in selecting POIs based on travel constraints. For example, POIs that are within a time constraint for travel may be displayed on the display device. The use of embodiments of the vehicle range projection as described herein may also result in improved off-cycle electrification of driving due to better understanding of trip feasibility and remaining range.

Turning now to FIG. 1, a system 100 upon which vehicle range projection may be implemented in an exemplary embodiment will now be described. The system 100 shown in FIG. 1 is located in a vehicle and includes a processor 102, range projection logic 114, a storage device 108, a display device 104, and a user input device 112. The processor 102 may be implemented by any computer processor that is suitable for being located in the vehicle and for performing the vehicle range projection described herein. In an exemplary embodiment, the system 100 is integrated into or is a vehicle control module such as, for example, an infotainment control module or a navigation control module. Though not shown, the system 100 may also include an antenna for communicating with a wireless communication network.

The user input device 112 typically includes a keypad or a keyboard for allowing a user to input information. In an embodiment, the display device 104 is a liquid crystal display (LCD) screen that is used to display graphics and text. Although FIG. 1 illustrates the user input device 112 and the display device 104 as separate components it is to be understood that the user input device 112 and the display device 104 may be a combined unit as well. For example, in an embodiment the display is a touchscreen that detects the presence and location of a user's touch.

In an embodiment, the system 100 is in communication with or includes a global positioning satellite ("GPS") receiver that is in communication with a satellite (not shown) for providing information regarding a current (or starting) location of the vehicle. Alternatively, the current (or starting) location of the vehicle is determined by obtaining user input. Specifically, the user may input current location information into a keypad or keyboard or touch screen of the user input device 112. In an embodiment, the range projection logic 114 includes travel constraint logic 106 and a mapping engine and database 110 for providing a vehicle range projection based on both routing objectives and travel constraints as described herein. For example, instead of choosing a destination against which an approximate 'cost-to-go' is determined, the cost-to-go to the target from any node is the negative scaled Euclidean distance to the vehicle's current location. By contrast, in conventional routing approaches, the cost-to-go approximation is done with respect to a single destination. The use of this approximation of the cost-to-go causes the range projection logic 114 to search in every larger area for a route. Additionally, the range projection logic 114 maintains a record of the total cost-to-go to arrive at a node from the vehicle's current location. When this cost-to-go from the vehicle location to the node if question exceeds the constraint cost, then the all searching from that node is terminated. These two mechanisms (a negative cost approximation to the vehicle's current location and the termination of searching based on node costs to the vehicle location) enable calculation of the range projection.

The range projection logic 114 may be a program that is included with the system 100 in a vehicle at the time of manufacture. Alternatively, the range projection logic 114 is a downloadable application that is saved in the memory of the system 100 after manufacture of the vehicle.

As described previously, travel constraints are vehicle range restrictions such as distance or travel time. In an embodiment, a user sets the travel constraints through the user input device 112. Alternatively a travel constraint is set automatically by the range projection logic 114 based on one or more known vehicle states (e.g., amount of remaining fuel or energy).

Figure 2:
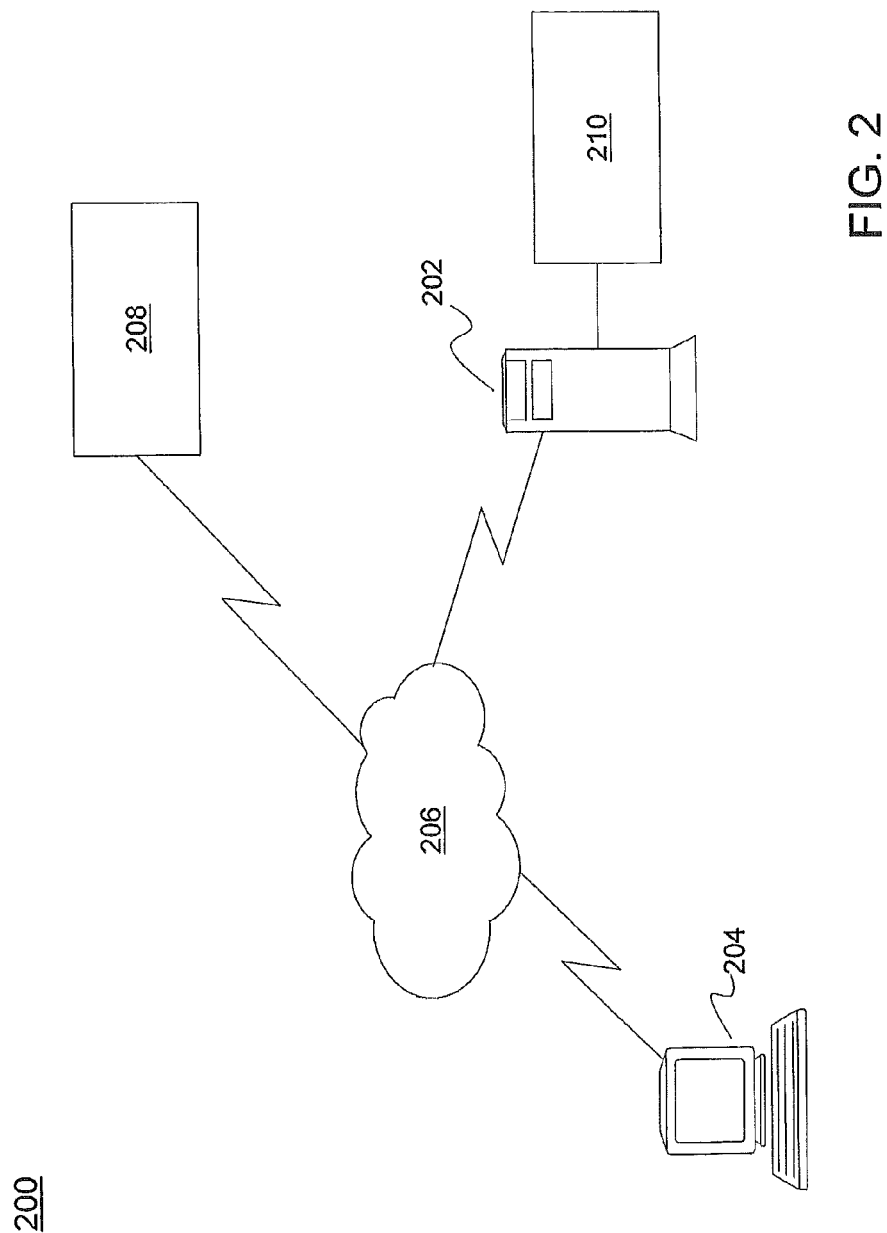
FIG. 2 is a system upon which vehicle range projection may be implemented in accordance with an alternate exemplary embodiment of the invention.

Turning now to FIG. 2, an alternate system 200 upon which vehicle range projection may be implemented in an exemplary embodiment of the invention will now be described. The system 200 includes a host system 202 in communication with a user system 204 over one or more networks 206. The host system 202 is also in communication, via the network 206, with a mapping engine and database 208.

As shown in FIG. 2, the host system 202 may be implemented by an enterprise for providing vehicle range projection and is configured with range projection logic 210 for performing the vehicle range projection described herein. In one embodiment, the host system 202 is implemented by an application service provider (ASP) to provide vehicle range projection to end users (e.g., vehicle consumers). The host system 202 may be implemented as a high-speed computer processing device (e.g., a mainframe computer) capable of handling a high volume of activities conducted between the host system 202 and the network entities shown in FIG. 2.

The host system 202 may operate as a web server including a web site for generating subscription accounts to vehicle range projection services and providing information to end users. The host system 202 may also operate as an application server including one or more applications for providing the vehicle range projection described herein. These one or more applications are collectively referred to herein as range projection logic 210.

The networks 206 may be any type of known networks in the art. For example, the networks 206 may be a combination of public (e.g., Internet), private (e.g., local area network, wide area network, virtual private network), and may include wireless and wireline transmission systems (e.g., satellite, cellular network, terrestrial networks, etc.).

In an embodiment, the user system 204 is included in a vehicle control module such as, for example, an infotainment control module or a navigation control module. In another embodiment, the user system 204 is a personal digital device such as, but not limited to, a cellular telephone or tablet computer. In an embodiment, the user system 204 includes an input device and a display device, such as those described previously with respect to FIG. 1.

In an embodiment, the system 200 is in communication with or includes a GPS receiver that is in communication with a satellite (not shown) for providing information regarding a current (or starting) location of the vehicle. Alternatively, the current (or starting) location of the vehicle is determined by obtaining user input. Specifically, the user may input starting location information into the user system 204. In the embodiment shown in FIG. 2, the range projection logic 210 includes travel constraint logic and it interfaces with the mapping engine and database 208 for providing a vehicle range projection based on both routing objectives and travel constraints as described herein.

It will be understood that while only a single user system 204 is shown in FIG. 2 for illustrative purposes, any number of user systems may be employed in realizing the advantages of the exemplary embodiments.

The mapping engine and database 208 includes a mapping tool that takes as input a starting location (e.g., address) and a destination location and returns as output one or more routes to follow to get from the starting location to the destination location subject to routing objectives. The mapping engine and database 208 includes a database of maps for generating the routes. The mapping engine and database 208 may be a proprietary tool or a commercial application, such as Google Maps®.

Figure 3:
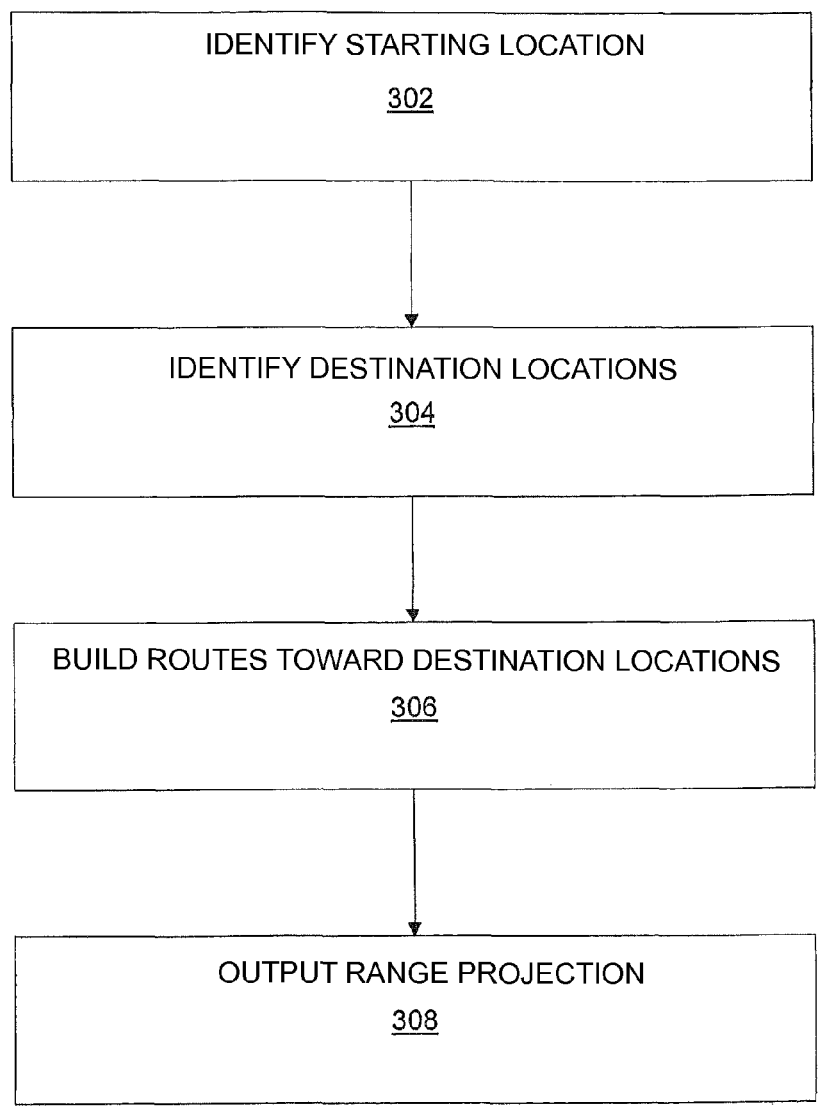
FIG. 3 is a flow diagram describing a process for implementing vehicle range projection in accordance with an exemplary embodiment of the invention.

FIG. 3 is a flow diagram describing a process for implementing vehicle range projection in accordance with an exemplary embodiment. As indicated above, vehicle range projection enables an operator to receive information about the locations that a vehicle can visit based on a routing method and a travel constraint. In an embodiment, the vehicle is a BEV or an EREV and the travel constraint is the amount of charge left in the vehicle. The process depicted in FIG. 3 is described using the system 100 shown in FIG. 1 as an example; the process shown in FIG. 3 may also be implemented by other embodiments, such as the system 200 shown in FIG. 2.

At step 302 in FIG. 3, the system 100 identifies a starting location that corresponds to the current location of the vehicle when it is received via a GPS receiver. Alternatively, the starting location may be received from a user of the system 100 via the user input device 112.

At step 304, destination locations are identified by the system 100 using the mapping engine and database 110. In an embodiment, an A* routing algorithm used by the mapping engine and database 110 is modified to route to locations farthest away from the origin (i.e., the starting location) by using a routing heuristic which is equal to the negative of a scaled Euclidean distance to the origin. This ensures that each routing decision chooses the point which produces travel away from the origin as efficiently as possible. In addition to the Euclidean distance, other metrics, such as Manhattan distances, p-norms, or similar measures of distance may be applied.

At step 306, routes are built toward the destination locations by the system 100 using the travel constraint logic 106 and the mapping engine and database 110 components of the range projection logic 114. In an embodiment, while developing the network of routed connects, a minimum of two costs are maintained. One cost corresponds to the routing cost and the other cost corresponds to the travel constraint cost. The routing algorithm in the mapping engine is prohibited from selecting neighboring nodes if the travel constraint is exceeded by the route. The routing algorithm terminates when all reachable points are searched. Using this approach, the cost to travel to the origin from each routed node is known. In this manner, the route is calculated using multiple costs which are used for independent purposes: routing and constraint evaluation.

A modified A* algorithm, written in pseudo code that is utilized by an exemplary embodiment to perform step 306 follows:

```
function A*(start,goal)
   // The set of nodes already evaluated.
   closedset := the empty set
   // The set of tentative nodes to be evaluated.
   openset := set containing the initial node
   // The map of navigated nodes.
   came_from := the empty map
   // Distance from start along optimal path.
   c_score[start] := 0
   g_score[start] := 0
   h_score[start] := heuristic_estimate_of_distance(start, goal)
   // Estimated total distance from start to goal through y.
   f_score[start] := h_score[start]
   while openset is not empty
      x := the node in openset having the lowest f_score[ ] value
      if x = goal
         return reconstruct_path(came_from, came_from[goal])
      remove x from openset
      add x to closedset
      for each y in constrained_neighbor_nodes(x,c_score[x])
         if y in closedset
            continue
         tentative_g_score := g_score[x] + dist_between(x,y)
         if y not in openset
            add y to openset
            tentative_is_better := true
         else if tentative_g_score < g_score[y]
            tentative_is_better := true
         else
            tentative_is_better := false
         if tentative_is_better = true
            came_from[y] := x
            g_score[y] := tentative_g_score
            h_score[y] := heuristic_estimate_of_distance(y, goal)
            f_score[y] := g_score[y] + h_score[y]
            c_score[y] := c_cost(x,y)+c_score[x]
            Update(openset,y)
   return failure
function reconstruct_path(came_from, current_node)
   if came_from[current_node] is set
      p = reconstruct_path(came_from, came_from[current_node])
      return (p + current_node)
   else
      return current_node
function constrained_neighbor_nodes(x,c_score)
   neighbor_set := empty set
   foreach y in neighbor_nodes(x)
      if c_score + c_cost(x,y)<threshold
         add y to neighbor_set
   return neighbor_set
function heuristic_estimate_of_distance(y,goal)
   return −1*(Euclidean distance between y and goal) *scaling_factor
```

At step 308, the range projection is output to the display device 104. In an embodiment, all nodes within a region are added to a list. For "reachable" nodes, the travel cost to reach these nodes is assigned to the nodes. For "unreachable"

nodes, a high value which exceeds the maximum travel cost is assigned to the node. In an embodiment, the map is partitioned into Voronoi cells and only cells with travel costs less than the travel constraint are considered. Depending on the display purpose either a filled area is displayed or an exterior perimeter is displayed. In an embodiment, the perimeter curvature is filtered. In an embodiment, cells within the perimeter are colored according to travel costs.

In an embodiment, the range projection is output, by the system 100, to the display device 104 at step 308 using the following sub-steps to mark (e.g., color) the cells according to travel costs:

1. Let R be the set of all reachable nodes on the map from the origin when routes per one criteria are subject to a constraint criteria.
2. Let d_max be the maximum distance from the origin to a reachable node in R.
3. Let C be collection of points on the perimeter of a circle which has a radius greater then d_max by some positive epsilon_1.
4. Let S be the set of all nodes within C.
5. Let c be the travel constraint cost associated with each node in R; if a node is not in R, then assign a value equal to the maximum travel constraint cost in R plus some positive epsilon_2. Let c[n] indicate the constraint cost for node n.
6. Let V be the Voronoi cells defined by C+S. Let V[n] indicate the Voronoi cell associated with node n.
7. Let M be a color mapping which defines an RGBA value which spans the range of c. (Red, Green, Blue, and Alpha (transparency))
8. For each node in S: assign a color to the Voronoi cell using the color mapping: V[n].color:=M[c[n]]
9. Render the Voronoi cells onto a surface with coordinate which match node coordinates.
10. Filter this surface using a low pass filter to blend the RGB components.
11. Render the filtered surface onto a display with map information.

Figure 4:
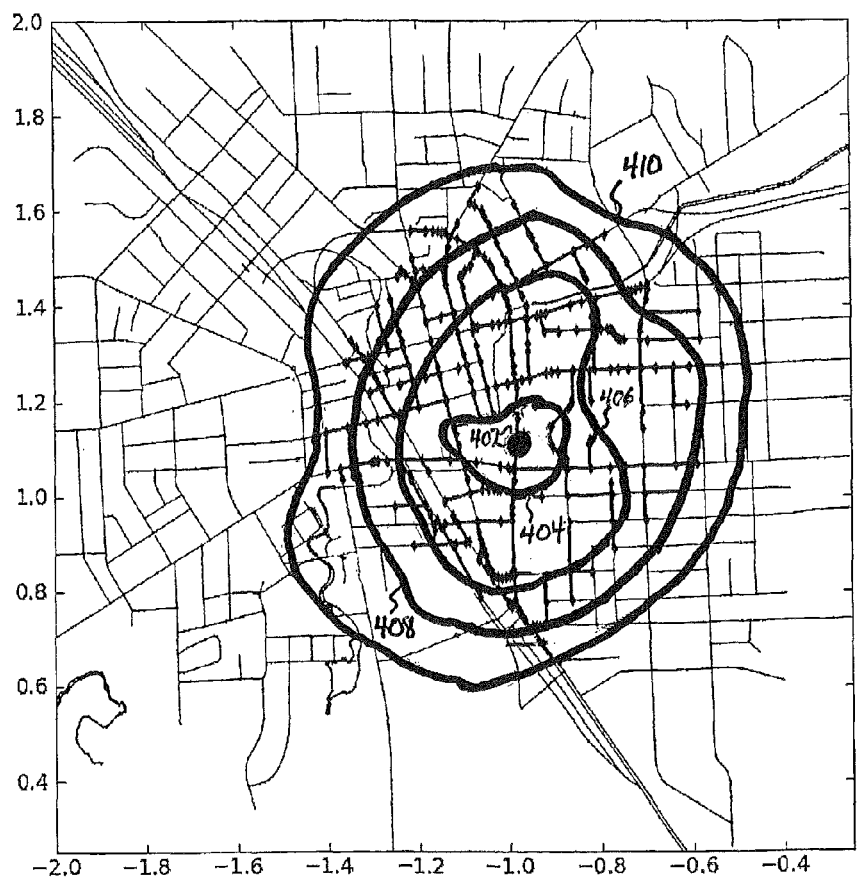
FIG. 4 is a sample output screen produced by a vehicle range projection system in accordance with an exemplary embodiment of the invention.

FIG. 4 is a sample output screen 400 produced by the system 100 in accordance with an exemplary embodiment. As shown in FIG. 4, there is a starting location node 402, a first region 404, a second region 406, a third region 408, and a fourth region 410. In an embodiment, the first region 404 includes nodes having a first travel cost, the second region 406 includes nodes having a second travel cost that is greater than the first travel cost, the third region 408 includes nodes having a third travel cost that is greater than the second travel cost, and the fourth region 410 includes nodes having a fourth travel cost that is greater than the third travel cost. Though shown in black and white in FIG. 4, the display may be in color, with each color denoting a different travel constraint. Any manner of delineating the different travel costs may be used by embodiments when displaying the vehicle range projection.

One method to improve the execution time of the range projection is to use 'step-gates'. A step-gate is implemented by first classifying all roads into categories. Generally, the more lanes or faster a road is, the higher its classification will be. Step-gate logic will only allow a node to consider routes which connect nodes to equal or higher classes of roads. This can be implemented by adding additional logic to the range projection logic 114, where feasible neighboring nodes are only admitted when the based on the road classifications.

Technical effects include the ability to take into account both routing objectives and travel constraints when projecting a travel range for a vehicle.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A system for providing vehicle range projection, the system comprising: a host system computer; and logic executable by the host system computer, the logic configured to implement a method, the method comprising:

identifying a starting location of a vehicle;

identifying a plurality of different destination locations for the vehicle;

defining a region reachable from the starting location by the vehicle by building a route from the starting location to each destination location of the plurality of different destination locations using a routing algorithm that is modified to use a negative of a distance from the starting location to the destination location based on routing objectives and travel constraints;

partitioning the region into a plurality of Voronoi cells based on the travel constraints of the vehicle; and outputting the region and the plurality of routes.

2. The system of claim 1, wherein the travel constraints include at least one of a distance, an amount of time, and an energy usage.

3. The system of claim 1, wherein the routing objectives include at least one of minimizing travel time, minimizing travel distance, and minimizing energy usage.

4. The system of claim 1, wherein the building the plurality of routes includes:

maintaining a travel cost for each of the plurality of routes; and eliminating a route responsive to the travel cost of the route exceeding at least one of the travel constraints.

5. The system of claim 1, wherein the outputting is to a display.

6. The system of claim 1, wherein the outputting the region comprises displaying the Voronoi cells in different colors based on the travel constraints of the vehicle.

7. The system of claim 1, wherein the routing algorithm comprises an A* algorithm.

8. A method for providing vehicle range projection, the method comprising:
- identifying a starting location of a vehicle;
- identifying a plurality of different destination locations for the vehicle;
- defining a region reachable from the starting location by the vehicle by building a route from the starting location to each destination location of the plurality of different destination locations using a routing algorithm that is modified to use a negative of a distance from the starting location to the destination location based on routing objectives and travel constraints;
- partitioning the region into a plurality of Voronoi cells based on the travel constraints of the vehicle; and
- outputting at least a portion of at least one route and travel cost information associated with the at least a portion of at least one route the region and the plurality of routes.

9. The method of claim 8, wherein the travel constraints include at least one of a distance, an amount of time, and an energy usage.

10. The method of claim 8, wherein the routing objectives include at least one of minimizing travel time, minimizing travel distance, and minimizing energy usage.

11. The method of claim 8, wherein the building the plurality of routes includes:
- maintaining a travel cost for each of the plurality of routes; and
- eliminating a route responsive to the travel cost of the route exceeding at least one of the travel constraints.

12. The method of claim 8, wherein the outputting is to a display.

13. The method of claim 8, wherein the outputting the region comprises displaying the Voronoi cells in different colors based on the travel constraints of the vehicle.

14. The method of claim 8, wherein the routing algorithm comprises an A* algorithm.

15. A computer program product for providing vehicle range projection, the computer program product comprising a non-transitory computer-readable storage medium encoded with instructions, which when executed by a computer cause the computer to implement a method, the method comprising:
- identifying a starting location of a vehicle;
- identifying a plurality of different destination locations for the vehicle;
- defining a region reachable from the starting location by the vehicle by building a route from the starting location to each destination location of the plurality of different destination locations using a routing algorithm that is modified to use a negative of a distance from the starting location to the destination location based on routing objectives and travel constraints;
- partitioning the region into a plurality of Voronoi cells based on the travel constraints of the vehicle; and
- outputting at least a portion of at least one route and travel cost information associated with the at least a portion of at least one route the region and the plurality of routes.

16. The computer program product of claim 15, wherein the travel constraints include at least one of a distance, an amount of time, and an energy usage.

17. The computer program product of claim 15, wherein the routing objectives include at least one of minimizing travel time, minimizing travel distance, and minimizing energy usage.

18. The computer program product of claim 15, wherein the building the plurality of routes includes:
- maintaining a travel cost for each of the plurality of routes; and
- eliminating a route responsive to the travel cost of the route exceeding at least one of the travel constraints.

19. The computer program of claim 15, wherein the outputting the region comprises displaying the Voronoi cells in different colors based on the travel constraints of the vehicle.

20. The computer program product of claim 15, wherein the routing algorithm comprises A* algorithm.

* * * * *